(12) United States Patent  
Schubert

(10) Patent No.: US 8,467,734 B2
(45) Date of Patent: Jun. 18, 2013

(54) WIRELESS TRANSCEIVER WITHIN AN ELECTRICAL RECEPTACLE SYSTEM

(75) Inventor: Clifford Schubert, Sidney (CA)

(73) Assignee: Schneider Electric USA, Inc., Palatine, IL (US)

( * ) Notice: Subject to any disclaimer, the term of this patent is extended or adjusted under 35 U.S.C. 154(b) by 0 days.

(21) Appl. No.: 13/460,923

(22) Filed: May 1, 2012

(65) Prior Publication Data

US 2012/0212332 A1  Aug. 23, 2012

Related U.S. Application Data

(63) Continuation of application No. 12/277,795, filed on Nov. 25, 2008, now Pat. No. 8,175,533.

(51) Int. Cl.
*H04B 7/00* (2006.01)
(52) U.S. Cl.
USPC ........... 455/66.1; 455/90.3; 455/67.7; 455/68
(58) Field of Classification Search
USPC .................. 455/66.1, 90.3, 67.7, 68, 67.6
See application file for complete search history.

(56) References Cited

U.S. PATENT DOCUMENTS

| | | | |
|---|---|---|---|
| 3,973,087 A | 8/1976 | Fong | |
| 5,874,903 A | 2/1999 | Shuey et al. | |
| 5,978,371 A | 11/1999 | Mason, Jr. et al. | |
| 6,020,657 A | 2/2000 | Liran | |
| 6,100,817 A | 8/2000 | Mason, Jr. et al. | |
| 6,288,456 B1 | 9/2001 | Cratty | |
| 6,380,852 B1 | 4/2002 | Hartman et al. | |
| 6,423,900 B1 | 7/2002 | Soules | |
| 6,574,672 B1 | 6/2003 | Mitchell et al. | |
| 6,694,125 B2 | 2/2004 | White et al. | |
| 6,731,904 B1 | 5/2004 | Judd | |

(Continued)

FOREIGN PATENT DOCUMENTS

| | | |
|---|---|---|
| GB | 2446274 | 8/2008 |
| WO | WO 03/030396 A3 | 4/2003 |

(Continued)

OTHER PUBLICATIONS

Digi International Inc.; "XBee™ Wall Router;" http://www.digi.com/products/wireless/zigbee-mesh/xbee-wall-router.jsp; 2008; (available as late as and printed in Jan. 2009); (2 pages).

(Continued)

*Primary Examiner* — Patricia Nguyen
(74) *Attorney, Agent, or Firm* — Nixon Peabody LLP

(57) ABSTRACT

An electrical receptacle assembly having a housing that includes a wireless transceiver electrically coupled to one or more antennas that can be integrated into the receptacle housing itself or in the receptacle's faceplate. The one or more antennas can be one or more dipoles or a single loop antenna. The housing also houses a power converter that derives its power directly from the line connection to the outlet. A junction box includes an integrated antenna reflector for improved radio direction and propagation relative to the antenna(s). Or, an antenna reflector insert is placed within the junction box behind the electrical receptacle assembly. The electrical receptacle assembly further includes a temperature sensor, a PLC module, or a current/voltage sensor and communicates associated data via its wireless transceiver. A status indicator is disposed on the front of the housing. A reset switch on housing resets the electronics to a default state.

34 Claims, 4 Drawing Sheets

U.S. PATENT DOCUMENTS

| | | |
|---|---|---|
| 7,050,819 B2 | 5/2006 | Schwengler et al. |
| 7,065,350 B2 | 6/2006 | Capobianco et al. |
| 7,079,808 B2 | 7/2006 | Striemer |
| 7,089,089 B2 | 8/2006 | Cumming et al. |
| 7,399,205 B2 | 7/2008 | McNeely et al. |
| 7,734,038 B2 | 6/2010 | Martich et al. |
| 7,761,555 B1 | 7/2010 | Bishel |
| 7,785,139 B1 | 8/2010 | Draggie et al. |
| 7,930,118 B2 | 4/2011 | Vinden et al. |
| 7,961,111 B2 | 6/2011 | Tinaphong et al. |
| 2004/0121648 A1 | 6/2004 | Voros |
| 2005/0042999 A1 | 2/2005 | Rappaport |
| 2005/0200205 A1 | 9/2005 | Winn et al. |
| 2006/0167569 A1 | 7/2006 | Colombi et al. |
| 2006/0271244 A1 | 11/2006 | Cumming et al. |
| 2006/0276144 A1 | 12/2006 | Campbell |
| 2007/0206521 A1 | 9/2007 | Osaje |
| 2007/0236359 A1 | 10/2007 | Wynans et al. |
| 2009/0201145 A1* | 8/2009 | Vasquez et al. ............ 340/539.1 |

FOREIGN PATENT DOCUMENTS

| | | |
|---|---|---|
| WO | WO 2004/032371 A1 | 4/2004 |
| WO | WO 2005/055478 A1 | 6/2005 |
| WO | WO 2006/098833 A1 | 9/2006 |

OTHER PUBLICATIONS

Digi International Inc.; "XBee™ Adapters, Routers, and Sensors User's Guide;" 2008; (available as late as and printed in Jan. 2009); (73 pages).

Tendril; "Plug into Your Customers;" http://www.tendrilinc.com/products_eoutlet.php; 2008; (available as late as and printed in Jan. 2009); (2 pages).

Hawking Technologies, Inc.; "HomeRemote™ Wireless Lamp Module" Data Sheet; Aug. 2008; (1 page).

Hawking Technologies, Inc.; "Wireless Lamp Module;" http://www.hawkingtech.com/products/productlist.php?CatID=43&FamID=115&ProdID=381; Aug. 2008; (3 pages).

SmartHome; "Wireless Outlet Dimmer;" http://67.59.186.106/brochures/Wireless_Outlet_Dimmer.pdf; 2008; (available as late as and printed in Jan. 2009); (2 pages).

Written Opinion Corresponding to co-pending International Patent Application Serial No. PCT/US2009/065544, European Patent Office; dated Mar. 25, 2010; 6 pages.

International Search Report Corresponding to co-pending International Patent Application Serial No. PCT/US2009/065544, European Patent Office; dated Mar. 25, 2010; 3 pages.

* cited by examiner

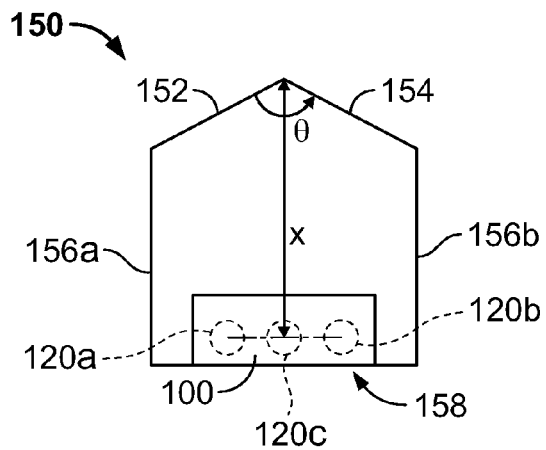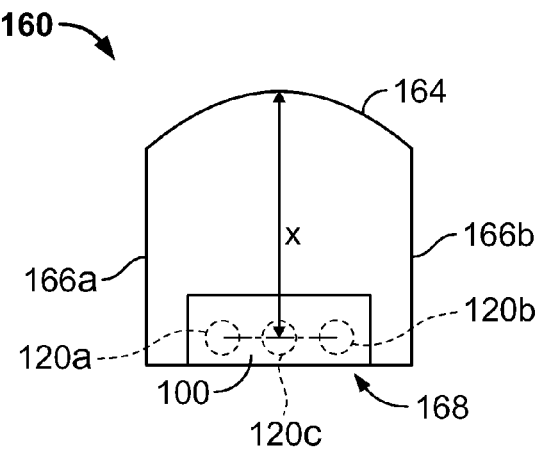
FIG. 3A  FIG. 3C
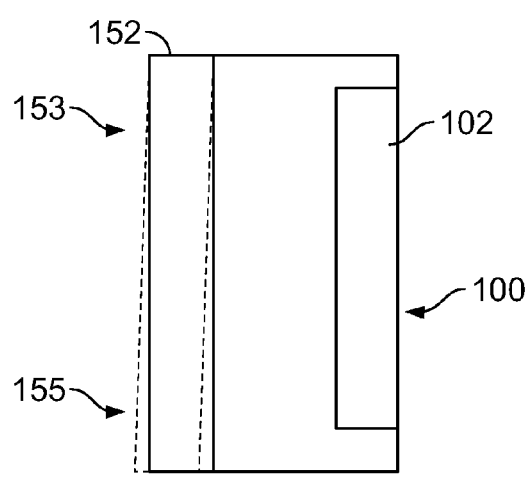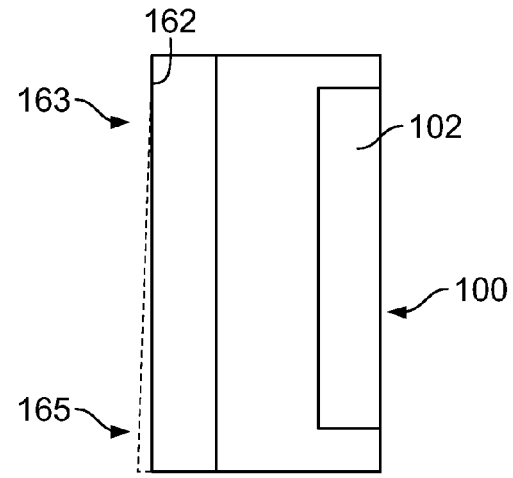
FIG. 3B  FIG. 3D

WIRELESS TRANSCEIVER WITHIN AN ELECTRICAL RECEPTACLE SYSTEM

CROSS REFERENCE TO RELATED APPLICATIONS

This application is a continuation of U.S. patent application Ser. No. 12/277,795, filed Nov. 25, 2008, entitled "Wireless Transceiver within an Electrical Receptacle System", now allowed, which is hereby incorporated by reference in its entirety.

FIELD OF THE INVENTION

Aspects disclosed herein relate generally to electrical receptacles, and, more particularly, to a wireless transceiver integrated into an electrical receptacle or a receptacle face plate.

BACKGROUND

Installation of radio repeaters in large, open areas is a time-consuming process that requires separate power connections to power each radio. When batteries are not an option, unsightly power cords to power each radio must be plugged into an electrical outlet and run to the radio. It can be preferable to install the radios in locations where they are as visually unobtrusive as possible, relegating the radios to hallways, corridors, or ceilings where their radio transmission is less effective. These radios are also susceptible to tampering, particularly when installed in public areas, and theft.

What is needed, therefore, is a wireless transceiver that is integrated within an electrical receptacle assembly. The present disclosure is directed to addressing these and other needs.

BRIEF SUMMARY

The proposed electrical receptacle system incorporates a wireless transceiver and an antenna into a standard electrical receptacle or faceplate. Installation times are dramatically reduced because a separate power connection is not required to be installed to power the transceiver electronics. Existing electrical receptacles, faceplates, or junction boxes can be quickly retrofitted or replaced with the new electrical receptacle system disclosed herein. A better radio network layout with improved coverage can be achieved because there are fewer restrictions on where the electrical receptacle systems can be placed. Electrical receptacles are visually acceptable in open, visible areas. Network reliability is increased because the proposed electrical receptacle system eliminates the possibility of tampering with or unplugging the radio components. Placement of an integrated antenna in the receptacle housing or faceplate can be leveraged with the dimensions of junction boxes to better direct and amplify the wireless signals. Electrical design can be simplified or isolation requirements can be more easily met if there is no way for the user to contact any part of the circuit powering the wireless components.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3A is a top of a junction box having an integrated antenna reflector that is bent at an angle;

FIG. 3B is a side view of the junction box shown in FIG. 3A;

FIG. 3C is a side view of a junction box having an integrated curved antenna reflector;

FIG. 3D is a side view of the junction box shown in FIG. 3C;

Figure 1:
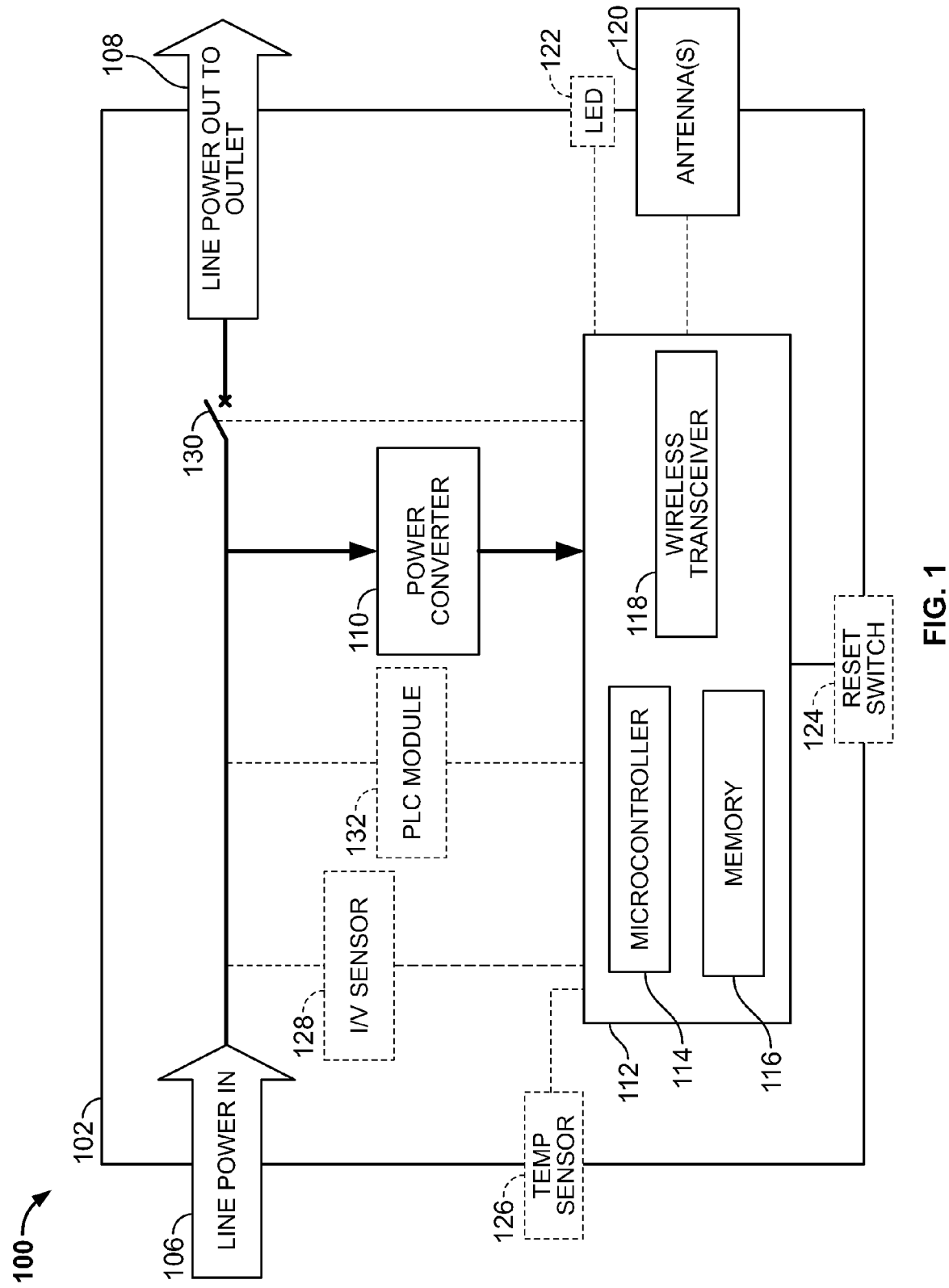
FIG. 1 is a functional block diagram of a wall-mounted electrical receptacle assembly according to aspects disclosed herein.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to FIG. 1, a functional block diagram of a wall-mounted electrical receptacle assembly 100 is shown. By "wall-mounted," it is meant to refer to electrical receptacles that are mounted flush against a surface, such as a wall, a ceiling, a floor, or a post. Such electrical receptacles are typically surrounded by a faceplate 140 (see FIG. 2B) and are mounted to a junction box positioned behind the wall, ceiling, floor, or post so that the faceplate 140 is flush against the surface of the wall, ceiling, floor, or post. The electrical receptacle assembly 100 includes a housing 102 that houses a number of electronic components. A line power input 106 carries line power from the electrical wiring to the electrical receptacle assembly 100 and is received in the housing 102 thereof. A line power output 108 carries the line power to an electrical socket or outlet that conventionally receives an external power plug. It should be noted that the electrical receptacle assembly 100 can and typically does include more than one electrical socket 104, such as two sockets 104a,b shown in FIG. 2A.

The housing 102 also includes a power converter 110 and a printed circuit board assembly 112, which includes a microcontroller 114, a memory 116, and a wireless transceiver 118. It should be noted that the memory 116 can be integrated into the microcontroller 114 or can be separate from it. The printed circuit board assembly 112 is electrically coupled to one or more antennas 120, an optional status indicator 122, shown as a light emitting diode (LED), an optional reset switch 124, an optional temperature sensor 126, an optional current/voltage sensor 128, an optional switch 130 for connecting and disconnecting power to the electrical socket 104, and an optional PLC module 132. The power converter 110 derives a direct current voltage power supply from the line power input 106 and powers the electronic components of the electrical receptacle assembly 100, including the components on the printed circuit board assembly 112, the status indicator 122, the temperature sensor 126, the current/voltage sensor 128, and the PLC module 132.

The components that are shown partially in and partially outside of the housing 102, such as the one or more antennas 120, the status indicator 122, the reset switch 124, and the temperature sensor 126, can be disposed within the housing, integrated into the housing, or disposed outside of the housing and electrically coupled to the printed circuit board assembly 112 via one or more wires.

The wireless transceiver 118, under control of the microcontroller 114, receives and transmits data via the one or more antennas 120 that is formatted according to a wireless communication protocol defined by the IEEE 802.15.4 standard that is operable between 868 MHz and 2.4 GHz. The IEEE 802.15.4 standard is the foundation for many wireless technologies such as ZigBee, which is a low-power, wireless mesh networking standard. A suitable ZigBee-enabled chipset is commercially available from Ember Corporation and other members of the ZigBee Alliance. In other implementations, other wireless protocols can be used, including those defined by any of the IEEE 802.15 or 802.11 wireless mesh networking standards. The wireless transceiver 118 and the one or more antennas 120 can operate as a repeater, which receives wireless data and retransmits it at a higher power, or as a wireless access device, a wireless bridge, or other wireless device.

The one or more antennas 120 are optional and can be positioned in a variety of locations as discussed in connection with FIGS. 2A-2C below. The status indicator 122 is controlled by the microcontroller 114 and can be placed in a variety of modes. For example, a steady output from the status indicator 122 can indicate that the electrical socket 104 is "live" or on, while an off state of the status indicator 122 indicates that the electrical socket 104 has been switched off such that no current flows to the electrical socket 104. For example, when the switch 130 is opened to sever the live connection to the electrical socket 104, the microcontroller 114 can change the status indicator's state from on to off. Alternatively, a steady "on" state can indicate an "all OK" status, meaning that all the systems within the electrical receptacle assembly are operating normally, including the wireless transceiver 118. Various flashing modes can indicate additional statuses. For example, the status indicator 122 can blink once in a periodic interval to indicate a problem, such as a problem with the wireless transceiver 118 or the microcontroller 114. The status indicator 122 can blink twice in a periodic interval to indicate a mode of operation that the wireless transceiver 118 is receiving or transmitting data. Other flashing patterns are also contemplated to indicate a status or mode of operation of any of the electronic components in the electrical receptacle assembly 100. The status indicator 122 is visible from an exterior of the housing 102 of the electrical receptacle assembly 100 when installed.

Figure 2A:
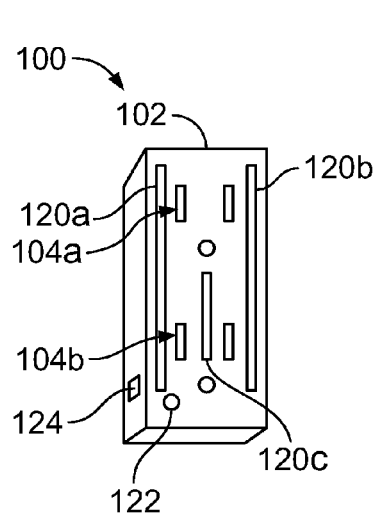
FIG. 2A is a perspective view of the electrical receptacle assembly shown in FIG. 1 having dipole antennas integrated into the housing.

The reset switch 124 is preferably placed either on the side of the housing 102 of the electrical receptacle assembly 100 (such as shown in FIG. 2A) or in the rear of the housing 102 that is opposite the side from which the outlet(s) 104 are accessible. This placement prevents a casual passerby to hit the reset switch 124. When the microcontroller 114 is initially powered on, it enters a default or pre-configured state, which can be reset to this default state by pressing the reset switch 124. Typically, the operator would have to remove the faceplate 140 to access the reset switch 124. Once the microcontroller 114 is in the default state, it can be further configured remotely via the wireless transceiver 118. Otherwise, the microcontroller 114 and the wireless transceiver 118 will operate according to the default configuration and can display status information via the status indicator 122 as discussed above.

The temperature sensor 126 can be placed adjacent to a faceplate 140 for recording the ambient temperature in the room in which the electrical receptacle assembly 100 is installed, or can be installed inside the enclosure of the electrical junction box for measuring the temperature inside the junction box. The temperature sensor 126 outputs a signal that is indicative of a temperature measured by the temperature sensor 126, and a representation of this output signal is received by the microcontroller 114, which can communicate data indicative of the temperature via the wireless transceiver to an external wireless device. The microcontroller 114 can also monitor the temperature inside the junction box via the temperature sensor 126, and when the temperature exceeds a predetermined threshold representing a safe upper limit, resulting in an over-temperature condition, the microcontroller 114 is programmed to transmit, via the wireless transceiver 118, an indication (e.g., a flag or temperature value) that the over-temperature condition exists to an external wireless device capable of receiving such an indication.

The current/voltage sensor 128 senses an electrical characteristic (e.g., current or voltage) of the line current from the line power connection 106. The current/voltage sensor 128 can include a resistor for producing a voltage representative of the voltage on the line power connection 106 or a conventional current transformer for producing a current representative of the current on the line power connection 106. The output of the current/voltage sensor 128 is indicative of the electrical characteristic (e.g., current, voltage, or power, which is derived from voltage and current) sensed by the sensor 128, and a representation (e.g., digital) of this output is received by the microcontroller 114. The microcontroller 114 in turn is programmed to communicate data indicative of the electrical characteristic via the wireless transceiver 118 to an external wireless device capable of receiving such data. The microcontroller 114 can monitor the electrical characteristic measured by the current/voltage sensor 128, and communicate, via the wireless transceiver 118, an alarm or other indicia when an anomaly is detected by the microcontroller 114. The anomaly can indicate an overload condition, an overvoltage, or other fault condition, or a loss of power from the line power connection, for example.

The switch 130 is controlled by the microcontroller 114 and can be automatically opened or closed by the microcontroller 114 (via a relay, motor, or other conventional electrical or electro-mechanical device) in response to an event, such as one of the anomalies mentioned above. The microcontroller 114 can receive an instruction via the wireless transceiver 118 from an external wireless device to switch power to the outlet 104 on or off, and responds accordingly by causing the switch 130 to connect (cause the switch 130 to be placed in an "on" state) or disconnect (cause the switch 130 to be placed in an "off") line power to the outlet 104a,b.

The PLC module 132 is capable of communicating radio signals over the power lines via a power line carrier (PLC) communication protocol. Any of the data that can be communicated via the wireless transceiver 118 can also be communicated via the PLC module 132. In this respect, the electrical receptacle assembly 100 operates as a bridge PLC to external wireless devices. In addition, the data transmitted to the PLC module 132 can be sent back out over the air via the wireless transceiver 118. Likewise, data received via the wireless transceiver 118 can be sent back out over the power lines via the PLC module 132. The PLC module 132 includes conventional components for carrying out PLC communications.

FIG. 2A is a perspective view of the electrical receptacle assembly 100 having dipole antennas 120 integrated into the housing 102. In the illustration, three dipole antennas 120a, b,c are shown. Twin dipole antennas 120a,b are positioned on opposite sides of the two electrical sockets 104a,b and a third dipole antenna 120c is positioned between the two electrical sockets 104a,b as shown. The twin dipole antennas 120a,b provide improved radio propagation. The housing 102 can include a slight protrusion to accommodate the antennas 120 such that the antennas are not exposed to the exterior of the housing 102. Alternately, the antennas 120a-c can be positioned behind the front face of the housing 102 in the locations shown such that the electrical receptacle assembly 100 visually resembles existing electrical receptacle assemblies. Less desirably, the antennas 120a-c can be disposed on the exterior surface of the front face of the housing 102. The antennas 120a-c are conventionally electrically coupled to the wireless transceiver 118 by separate wires (not shown). In another implementation, the antenna 120c can be removed, leaving only the pair of antennas 120a,b on either side of the sockets 104a,b. Alternately, in still other implementations, only one of the antennas 120a or 120b is positioned relative to the front face of the housing 102. The status indicator 122 is also visible from the front face of the housing 102 as shown.

Figure 2C:
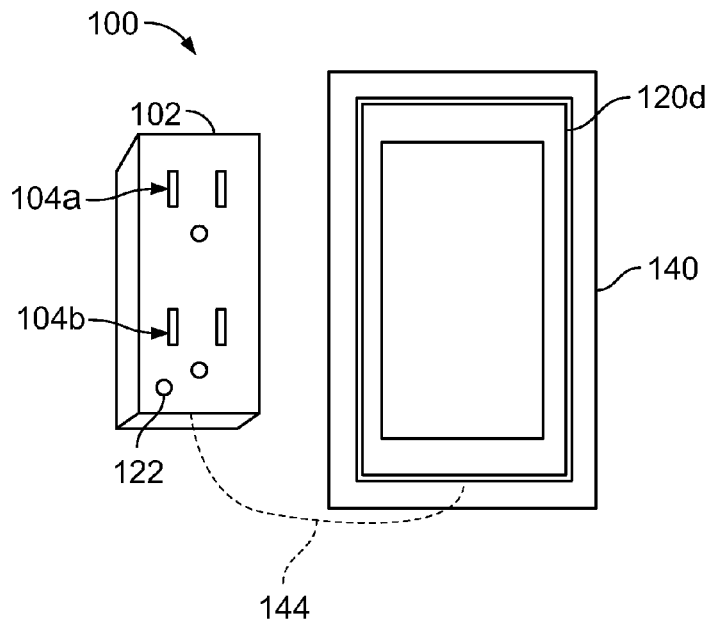
FIG. 2C illustrates the faceplate with a loop antenna instead of the twin dipole antennas as shown in FIG. 2B.
Figure 2B:
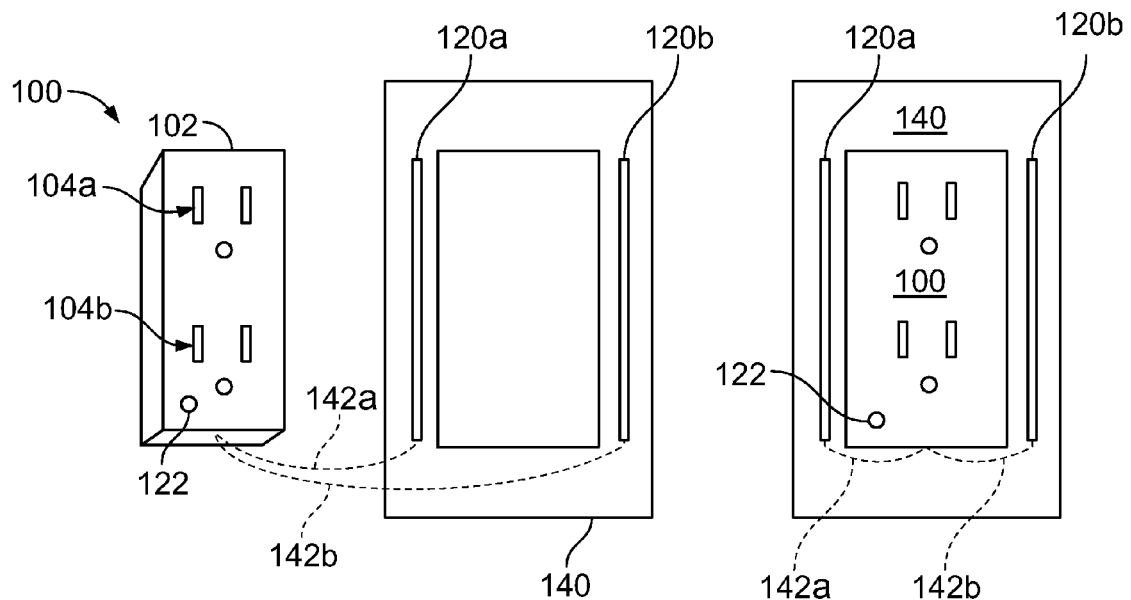
FIG. 2B illustrates an electrical receptacle assembly together with a faceplate into which the one or more dipole antennas are integrated.

FIG. 2B illustrates an electrical receptacle assembly 100 together with a faceplate 140 into which the one or more dipole antennas 120 are integrated. The faceplate 140 includes a conventional opening for receiving the electrical receptacle assembly 100 therein. The twin dipole antennas 120a,b are positioned on opposite sides of the opening of the faceplate 140. Again, as described in connection with FIG. 2A, the twin dipole antennas 120a,b can be received in molded protrusions formed in the faceplate 140 or can be positioned behind the front surface of the faceplate 140 so that the front surface of the faceplate 140 visually resembles a conventional faceplate. Connecting wires 142a,b electrically couple the antennas 120a,b to the wireless transceiver 118 in the electrical receptacle assembly 100.

FIG. 2C illustrates the faceplate 140 with a loop antenna 120d instead of the twin dipole antennas as shown in FIG. 2B. The loop antenna 120d is in the shape of a loop that encircles the opening of the faceplate 140. A connecting wire 144 electrically couples the loop antenna 120d to the wireless transceiver 118.

Turning now to FIGS. 3A-3D, there is shown various views of a customized junction box 150, 160 with a built-in antenna reflector for reflecting or propagating electromagnetic signals toward the one or more antennas 120 in or around the electrical receptacle assembly 100. Such reflectors improve wireless direction or propagation characteristics of the electromagnetic signals produced by or received at the antennas. The junction box 150, 160, together with the faceplate 140 and the electrical receptacle assembly 100 comprise an electrical receptacle system. In a first implementation, the junction box 150 has a front opening 158 that receives the electrical receptacle assembly 100, two opposing side walls 156a,b, and a back portion that forms a shaped antenna reflector 152, 154. The shaped antenna reflector 152, 154 is bent at an obtuse angle, θ, which depends upon the size of the junction box 150 and the distance, x, away from the antennas 120 in the electrical receptacle assembly 100 or in the faceplate 140. In FIG. 3B, a side view of the junction box 150 shown in FIG. 3A shows that the first angled portion 152 of the antenna reflector is substantially parallel to the housing 102 of the electrical receptacle assembly 100. However, as the dashed lines indicate, the antenna reflector 152, 154 can be tilted at an angle relative to the housing 102 such that a top portion 153 of the antenna reflector 152, 154 is tilted relative to a bottom portion 155 of the antenna reflector 152, 154 as shown in FIG. 3B.

FIG. 3C also shows a shaped antenna reflector 164, except that this one has a curved or generally hemispherical shape. Like the antenna reflector shown in FIG. 3A, the antenna reflector 164 can be generally parallel to a rear surface of the housing 102 along a height dimension of the junction box 160. Alternately, as indicated by the dashed lines in FIG. 3D, the antenna reflector 164 can be tilted at an angle relative to the housing 102 such that a top portion 163 of the antenna reflector 164 is tilted away from or toward a bottom portion 165 of the antenna reflector 164 as shown in FIG. 3D. The shaped antenna reflectors 152, 154, 164 can be made of metal or foil with a non-conductive coating.

Figure 4A:
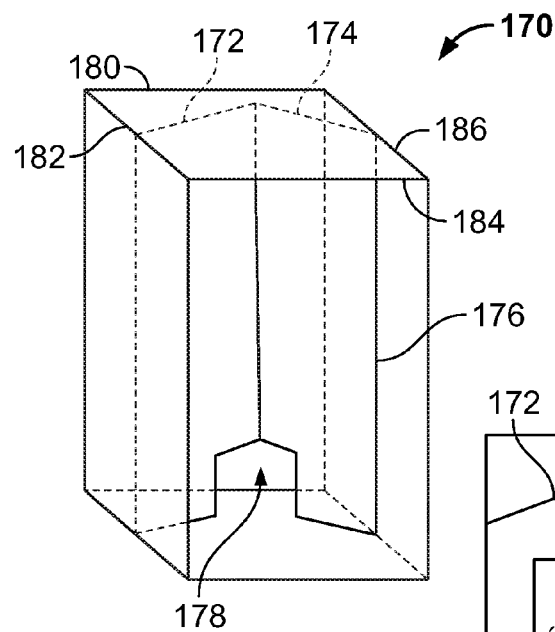
FIG. 4A is a perspective view of a junction box into which an antenna reflector insert has been inserted.

FIGS. 4A-4E illustrate different antenna reflector inserts that can be inserted into an electrical junction box, such as an existing junction box, to provide an antenna reflector function for the antennas 120 in the electrical receptacle assembly 100 or in the faceplate 140, depending upon the implementation. FIG. 4A is a perspective view of a junction box 170 into which an antenna reflector insert 172, 174 has been inserted. The antenna reflector insert 172, 174 includes two portions that are bent relative to one another at an angle, θ, as discussed above in connection with FIG. 3A. A notch or opening 178 is formed in a base section of the antenna reflector insert 172, 174 as shown to receive therethrough electrical wiring carrying the line, neutral, and other wiring connections to the electrical receptacle assembly 100.

Figure 4B:
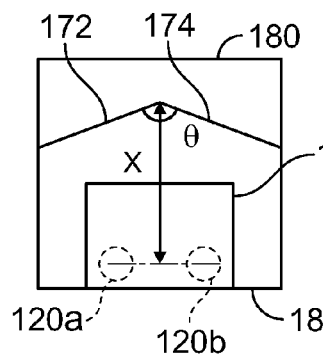
FIG. 4B is a top view of a junction box having an antenna reflector insert that is bent at an angle.
Figure 4D:
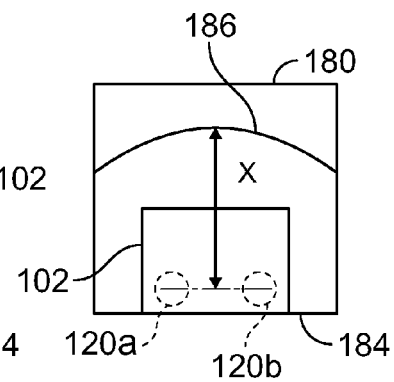
FIG. 4D is a top view of a junction box having a curved antenna reflector insert.
Figure 4C:
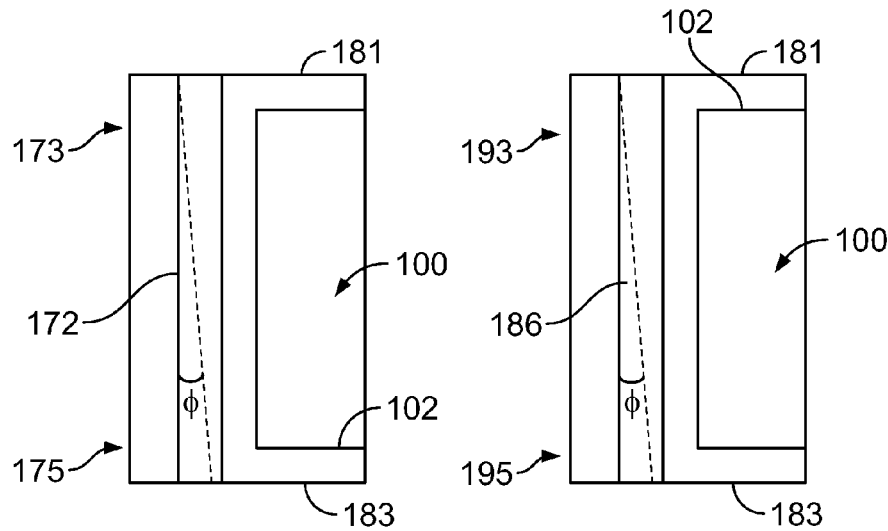
FIG. 4C is a side view of the junction box shown in FIG. 4B.

FIGS. 4B and 4C are similar to FIGS. 3A and 3B in that the antenna reflector insert 172, 174 is bent at an angle like the antenna reflector 152, 154 of FIG. 3A. Performed registration members (not shown) within the junction box 180 can help guide the operator to the proper installation location of the antenna reflector insert 172, 174. The operator can slide the antenna reflector insert 172, 174 into the interior of the junction box 170 until it snaps or clicks into place via the registration members. In this way, the operator can be assured that the proper or desired angle, θ, is maintained, as well as the proper or desired distance, x, between the antenna reflector insert 172, 174 and the antennas 120. And, like the antenna reflector 152, 154 shown in FIG. 3B, the antenna reflector insert 172, 174 can be tilted at an angle relative to the housing 102 such that a top portion 173 of the antenna reflector insert 172, 174 is tilted away from or toward (as shown in FIG. 4C) a bottom portion 175 of the antenna reflector insert 172, 174.

Figure 4E:
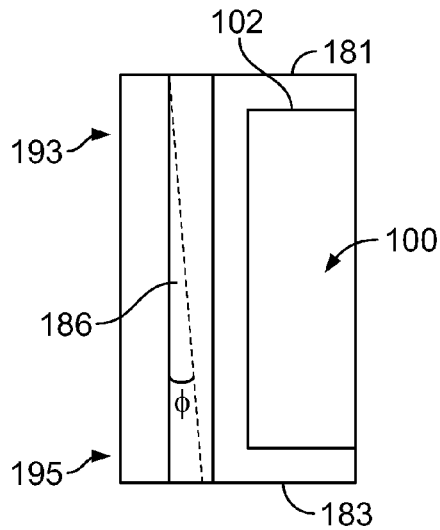
FIG. 4E is a side view of the junction box shown in FIG. 4D.

FIGS. 4D and 4E are similar to FIGS. 3C-3D in that a curved antenna reflector insert 186 is introduced, this time as a separate insert into the junction box 180. Like the implementation described in connection with FIGS. 4B and 4C, preformed registration members (not shown) within the junction box 180 can help guide the operator to the proper installation location of the antenna reflector insert 186. Like the antenna reflector 164 shown in FIG. 3C, the antenna reflector insert 186 can be tilted at an angle relative to rear surface of the housing 102 such that a top portion 193 of the antenna reflector insert 186 is tilted away from or toward (as shown in FIG. 4E) a bottom portion 195 of the antenna reflector insert 186.

The dimensions of the electrical receptacle assemblies, faceplates, and junction boxes herein are substantially the same as existing ones. Existing junction boxes can be retrofitted with an antenna reflector insert, and an existing electrical receptacle assembly can be quickly replaced with the electrical receptacle assembly 100, and, if necessary, an existing faceplate can be quickly replaced with the faceplate 140. Existing junction boxes can be easily swapped out and replaced with the junction boxes 150, 160 with built-in antenna reflectors. The exterior visual appearance of the faceplate 140 and the electrical receptacle assembly 100 can be no different than traditional ones. The electrical receptacle assembly 100 and the faceplate 140 visually appear as nondescript and unobtrusive as their respective predecessors, which renders them unlikely to be tampered with.

Exemplary applications, uses, or fields of use include home networking or wireless communication, wireless hotspots, applications where low power radio coverage is required like hospitals, localized paging systems, asset tracking systems, asset locationing systems, asset management systems, RFID systems, personnel tracking systems, and security systems. The electrical receptacle assembly 100 can also support a web interface for viewing data or statistics.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A wall-mounted electrical receptacle assembly for installation into an electrical junction box, comprising:
   a housing that houses a microcontroller coupled to a wireless transceiver that is electrically coupled to one or more antennas and a power converter that powers the microcontroller and the wireless transceiver;
   an electrical socket for receiving a power plug through the housing, wherein the power converter derives its power from the line power connection to which the electrical socket is connected;
   a switch configured to connect the electrical socket to the line power connection or disconnect the electrical socket from the line power connection, the microcontroller being programmed to receive an instruction via at least the wireless transceiver to cause a state of the switch to change between an on state and an off state; and
   a power line communication (PLC) module coupled to the microcontroller,
   the microcontroller being programmed to communicate PLC data according to a PLC protocol, the PLC module communicating the PLC data over the power line connection, the microcontroller being further programmed to cause the state of the switch to change between the on state and the off state in accordance with the PLC data received over the power line connection.

2. The electrical receptacle assembly of claim 1, further comprising a sensor that senses an electrical characteristic of the line current from the line power connection, the microcontroller receiving an output signal from the sensor indicative of the electrical characteristic and communicating data indicative of the electrical characteristic via the wireless transceiver, the microcontroller being programmed to cause the state of the switch to change between the on state and the off state in response to the data indicative of the electrical characteristic indicating a fault condition or a loss of power from the line power connection.

3. The electrical assembly of claim 1, further comprising a temperature sensor coupled to the microcontroller, the microcontroller being programmed to receive a signal from the temperature sensor indicative of a temperature measured by the temperature sensor and communicating, via the wireless transceiver, temperature data indicative of the ambient temperature.

4. The electrical assembly of claim 1, further comprising a temperature sensor coupled to the microcontroller, the microcontroller being programmed to receive a signal from the temperature sensor indicative of a temperature measured by the temperature sensor and cause the state of the switch to change between the on state and the off state based on whether the signal indicates that an over-temperature condition exists based on a comparison of the measured temperature with a predetermined threshold.

5. The electrical receptacle assembly of claim 1, further comprising a status indicator visible through the housing and controlled by the microcontroller, the status indicator being configured to indicate the state of the switch.

6. The electrical receptacle assembly of claim 1, wherein the one or more antennas are integrated into the housing of the electrical receptacle assembly and electrically coupled to the wireless transceiver.

7. The electrical receptacle assembly of claim 1, in combination with a faceplate having an opening to receive the electrical receptacle assembly therein, wherein the one or more antennas are integrated with the faceplate and are electrically coupled to the wireless transceiver by one or more electrical wires.

8. The electrical receptacle assembly of claim 1, in combination with an electrical junction box, the electrical junction box having a front opening that receives the housing and a back portion opposite the front opening, the back portion forming a shaped antenna reflector that reflects electromagnetic signals toward the one or more antennas.

9. The electrical receptacle assembly of claim 1, in combination with an electrical junction box and an antenna reflector insert that is inserted into the electrical junction box behind the electrical receptacle assembly for reflecting electromagnetic signals toward the one or more antennas.

10. A wall-mounted electrical receptacle assembly for installation into an electrical junction box, comprising:
    a housing that houses a microcontroller, a wireless transceiver, a power converter, and a power line communication (PLC) module,
    the wireless transceiver being coupled to the microcontroller and to one or more antennas,
    the power converter powering the microcontroller and the wireless transceiver; and
    an electrical socket for receiving a power plug through the housing, wherein the power converter derives its power from the line power connection to which the electrical socket is connected, wherein
    the PLC module is coupled to the microcontroller, the microcontroller being programmed to communicate PLC data according to a PLC protocol, and the PLC module communicating the PLC data over the power line connection, wherein the one or more antennas are integrated into the housing of the electrical receptacle assembly and electrically coupled to the wireless transceiver.

11. The electrical assembly of claim 10, wherein the PLC module is configured to communicate the PLC data to the wireless transceiver for communication as wireless data via the one or more antennas.

12. The electrical assembly of claim 10, wherein the microcontroller is programmed to communicate wireless data received via the wireless transceiver to the PLC module.

13. The electrical assembly of claim 10, further comprising a temperature sensor coupled to the microcontroller, the microcontroller being programmed to receive a signal from the temperature sensor indicative of a temperature measured by the temperature sensor and communicating, via the wireless transceiver or the PLC module, temperature data indicative of the measured temperature.

14. The electrical receptacle assembly of claim 13, wherein the microcontroller is programmed to transmit, via the wireless transceiver, an indication that an over-temperature condition exists in response to the measured temperature exceeding a predetermined threshold.

15. The electrical receptacle assembly of claim 10, further comprising a switch configured to connect the electrical socket to the line power connection or disconnect the electrical socket from the line power connection, the microcontroller being programmed to receive an instruction via the wireless transceiver or the PLC module to cause a state of the switch to change between an on state and an off state.

16. The electrical receptacle assembly of claim 10, further comprising a sensor that senses an electrical characteristic of the line current from the line power connection, the microcontroller receiving an output signal from the sensor indicative of the electrical characteristic and communicating data indicative of the electrical characteristic via the wireless transceiver or the PLC module.

17. The electrical receptacle assembly of claim 10, further comprising a status indicator visible through the housing and controlled by the microcontroller, the status indicator being configured to indicate a mode of operation that the wireless transceiver is communicating wireless data or that the PLC module is communicating PLC data.

18. The electrical assembly of claim 10, wherein the microcontroller is programmed to communicate wireless data via the one or more antennas according to a wireless communication protocol defined by the IEEE 802.11 or 802.15 standard.

19. The electrical assembly of claim 10, wireless transceiver is part of a repeater, a wireless access device, or a wireless bridge.

20. The electrical receptacle assembly of claim 10, in combination with a faceplate having an opening to receive the electrical receptacle assembly therein, wherein the one or more antennas are integrated with the faceplate and are electrically coupled to the wireless transceiver by one or more electrical wires.

21. The electrical receptacle assembly of claim 10, in combination with an electrical junction box, the electrical junction box having a front opening that receives the housing and a back portion opposite the front opening, the back portion forming a shaped antenna reflector that reflects electromagnetic signals toward the one or more antennas.

22. The electrical receptacle assembly of claim 10, in combination with an electrical junction box and an antenna reflector insert that is inserted into the electrical junction box behind the electrical receptacle assembly for reflecting electromagnetic signals toward the one or more antennas.

23. A wall-mounted electrical receptacle assembly, in combination with a faceplate having an opening to receive the electrical receptacle assembly therein, for installation into an electrical junction box, comprising:
a housing that houses a microcontroller coupled to a wireless transceiver that is electrically coupled to one or more antennas and a power converter that powers the microcontroller and the wireless transceiver, the wireless transceiver being configured to receive and transmit wireless data using the one or more antennas;
an electrical socket for receiving a power plug through the housing, wherein the power converter derives its power from the line power connection to which the electrical socket is connected; and
a web interface for viewing the wireless data or statistics, wherein the one or more antennas are integrated with the faceplate and are electrically coupled to the wireless transceiver by one or more electrical wires.

24. The electrical receptacle assembly of claim 23 further comprising a power line communication (PLC) module coupled to the microcontroller, the microcontroller being programmed to communicate data according to a PLC protocol, the PLC module communicating the data over the power line connection.

25. The electrical receptacle assembly of claim 23, further comprising a temperature sensor coupled to the microcontroller, the microcontroller being programmed to receive a signal from the temperature sensor indicative of a temperature measured by the temperature sensor and communicating, via the wireless transceiver, corresponding temperature data.

26. The electrical receptacle assembly of claim 25, wherein the microcontroller is programmed to transmit, via the wireless transceiver, an indication that an over-temperature condition exists in response to the measured temperature exceeding a predetermined threshold.

27. The electrical receptacle assembly of claim 23, further comprising a switch configured to connect the electrical socket to the line power connection or disconnect the electrical socket from the line power connection, the microcontroller being programmed to receive an instruction via the wireless transceiver to cause a state of the switch to change between an on state and an off state.

28. The electrical receptacle assembly of claim 23, further comprising a sensor that senses an electrical characteristic of the line current from the line power connection, the microcontroller receiving an output signal from the sensor indicative of the electrical characteristic and communicating data indicative of the electrical characteristic via the wireless transceiver.

29. The electrical receptacle assembly of claim 23, further comprising a status indicator visible through the housing and controlled by the microcontroller, the status indicator being configured to indicate a mode of operation that the wireless transceiver is communicating wireless data.

30. The electrical assembly of claim 23, wherein the microcontroller is programmed to communicate wireless data via the one or more antennas according to a wireless communication protocol defined by the IEEE 802.11 or 802.15 standard.

31. The electrical receptacle assembly of claim 23, wherein the one or more antennas are integrated into the housing of the electrical receptacle assembly and electrically coupled to the wireless transceiver.

32. The electrical receptacle assembly of claim 23, in combination with an electrical junction box, the electrical junction box having a front opening that receives the housing and a back portion opposite the front opening, the back portion forming a shaped antenna reflector that reflects electromagnetic signals toward the one or more antennas.

33. The electrical receptacle assembly of claim 23, in combination with an electrical junction box and an antenna reflector insert that is inserted into the electrical junction box behind the electrical receptacle assembly for reflecting electromagnetic signals toward the one or more antennas.

34. A wall-mounted electrical receptacle assembly for installation into an electrical junction box, comprising:
- a housing that houses a microcontroller, a wireless transceiver, a power converter, and a power line communication (PLC) module,
- the wireless transceiver being coupled to the microcontroller and to one or more antennas,
- the power converter powering the microcontroller and the wireless transceiver;
- a temperature sensor coupled to the microcontroller; and
- an electrical socket for receiving a power plug through the housing, wherein the power converter derives its power from the line power connection to which the electrical socket is connected, wherein
- the PLC module is coupled to the microcontroller, the microcontroller being programmed to communicate PLC data according to a PLC protocol, and the PLC module communicating the PLC data over the power line connection,
- the microcontroller being programmed to receive a signal from the temperature sensor indicative of a temperature measured by the temperature sensor and communicating, via the wireless transceiver or the PLC module, temperature data indicative of the measured temperature.

* * * * *